INVENTOR.
Franklin S. Smith
Robert S. Blair ATTORNEY.

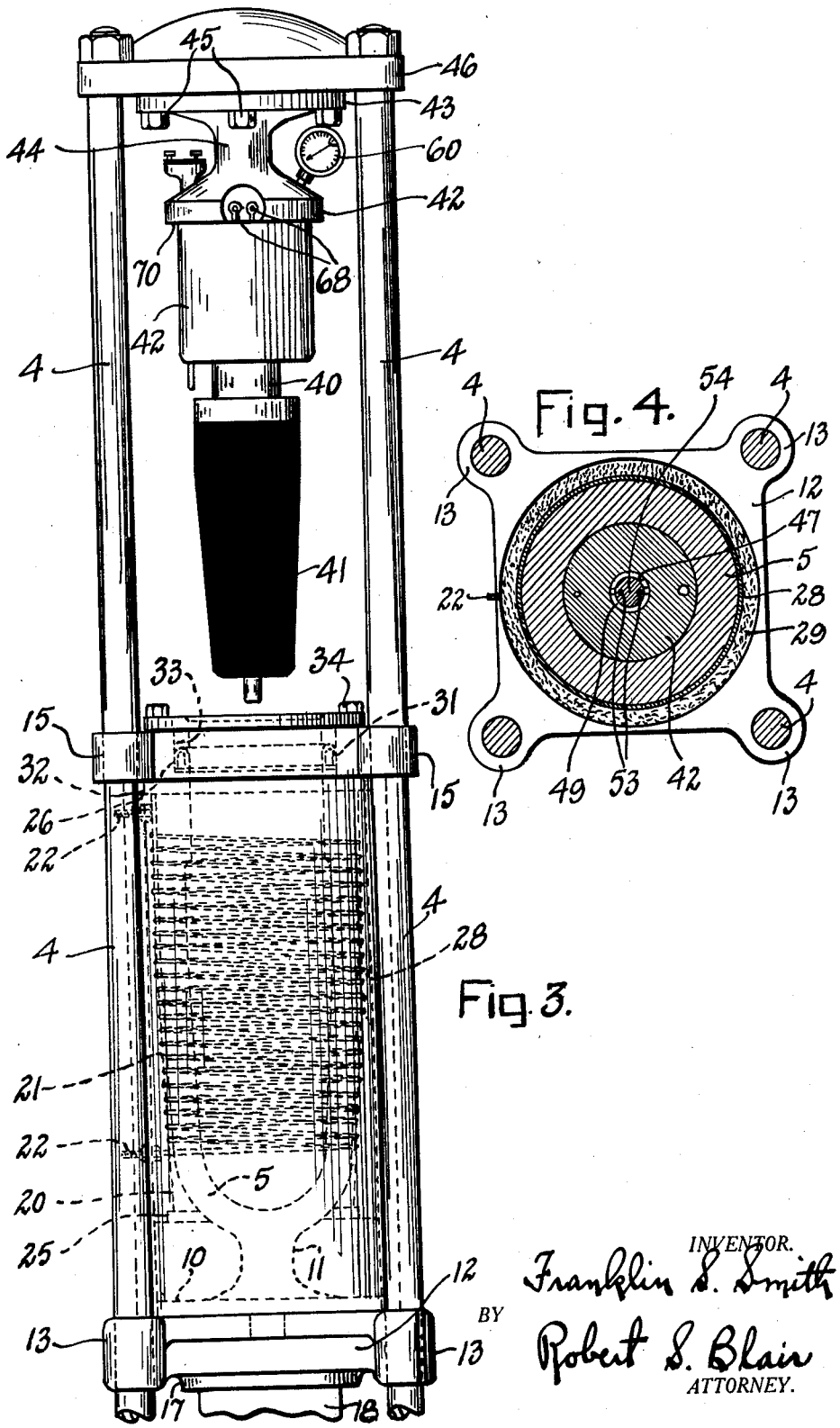

Patented May 29, 1934

1,960,717

UNITED STATES PATENT OFFICE 1,960,717

APPARATUS FOR TREATING MOLDINGS OF PARTIALLY CURED PHENOLIC CONDENSATION PRODUCT

Franklin S. Smith, Brooklyn, N. Y.

Original application July 29, 1924, Serial No. 728,985. Divided and this application November 29, 1926, Serial No. 151,348

26 Claims. (Cl. 18—17)

The general object of my invention is to provide a novel apparatus for producing molded articles of phenolic condensation product suitable for use for the various purposes for which such product is adapted; for example, high voltage terminals for electric transformers such as are disclosed in my applications for Letters Patent, Serial No. 449,212 and No. 544,640, filed March 2, 1921 and March 17, 1922, respectively.

In use such terminals are subjected to high internal gas pressure, the said pressure being on the order of fifteen (15) atmospheres per square inch. It is essential, therefore, that the tensile strength and density of the said terminals shall be as great as possible. Likewise the dielectric strength also should be as high as possible and the external surface resistivity is of especial importance for outdoor operation. The material usually employed for molding such terminals consists of wood flour impregnated with phenolic condensation product. The frictional resistance of such mixture to flow within a mold is great even at the optimum molding temperature.

In practice all moldings of these materials made in mechanical molds are of heterogeneous density. Usually the larger the molding, that is the thicker the walls, the less uniform is the density. Such non-uniformity of density is especially apparent in large articles or moldings—for instance articles or moldings of the order of ten (10) pounds and of the configuration illustrated in the drawings of this application. By a mechanical mold is meant one in which the molding material is compressed and caused to flow by one or more plungers movable relatively to the chase of the mold.

In my application for Letters Patent of the United States, filed September 15, 1920, Serial No. 410,456, I have disclosed a method of molding phenolic condensation product in which the mixture of wood flour and phenolic condensation product is subjected to a preheating and drying operation prior to the placing of the same in molds for molding the same into the form of such articles as may be desired. While the said method possesses many advantages over the methods previously known it is open to the objection that the articles produced thereby are not of uniform density which, however, is due to the fact that the article is molded in a mechanical mold and the curing process completed with the article therein. On account of the non-uniform density of articles of phenolic condensation product which are molded within a mechanical mold and cured therein the wall thickness of such articles, as for example high voltage terminals, must conform to that thickness which is suitable or requisite for the portion of lowest density of the molding. In the case of moldings for use as high voltage terminals the characteristic of non-uniformity present in moldings made according to previously known processes or methods necessitates a structure of considerably greater wall thickness than would be necessary if the density of the moldings were of uniform density equal substantially to the maximum density throughout the structure.

Such lack of uniformity in the density of the molded articles entails greater expense in the making of the moldings than should be necessary. One item of increased expense consists of the increased amount of material which of necessity must be used to increase the wall thickness so as to provide that at the point of least density the requisite strength shall be assured. When the molded article is cured in the mechanical mold by which it may have been formed there is not only the expense incident to the tying up of the mold during the curing process but also the expense incident to the length of time required for the curing process. These two items combined constitute the greatest item of expense involved in the methods as heretofore practised.

In the carrying out of the method embodying the present invention the mixture of wood flour and phenolic condensation product, form A, is subjected first to a drying and preheating process as is described in my application Serial No. 410,456, above referred to. The mixture having been subjected to a drying and a preheating treatment at a temperature below its transition point, a little below eighty (80) degrees centigrade, it is then packed or rammed into a mechanical mold which is closed by means of an hydraulic press, and the material partially cured therein. The period of such partial curing depends primarily upon the wall thickness of the molding. A molding having a wall an inch in thickness should be kept in the mold for partial curing around ten minutes. The curing should be effected from the inside of the mold outwardly. This may be accomplished by providing that the mandrel within and upon which the molding is formed may be heated to a higher temperature than the external portion or chase of the mold. After the mixture has been placed in the mold, as above described, the temperature is raised to a temperature sufficient to transform product A to product C, say on the order of 140° C.

After the molding has been partially cured in the mold in which it is formed it is removed with the mandrel and quickly (to avoid temperature drop) placed within a liquid which preferably should be chemically neutral with respect to the material of which the molding is composed and of greater viscosity than water. It is desirable that the liquid used should be relatively viscous as otherwise it would tend to seep in between the mandrel and the product under treatment as will be apparent in the following. It is essential that this material should be a liquid at the temperature of treatment and a solid at normal atmospheric temperatures at which the finished product is to be used. Such liquid preferably consists of "cumar", a dielectric which is a synthetic resin produced from coal tar distillates. Chemically it is a mixture of para-coumarone, para-indene and the polymers of other hydrocarbons found in coal tar. At normal atmospheric temperature "cumar" is a solid but at the temperature at which the curing is effected, one hundred and forty (140) degrees centigrade or higher, the said substance is a liquid of sufficient viscosity. Instead of "cumar", chlorinated naphthalene (known in the trade as "Halowax"), also a dielectric, may be employed.

Whether the one or the other of these substances is employed the said substance is placed in a receptacle of the static press and, when melted, the molding, with the mandrel upon which it is moulded and carried in its original relative position, is inserted and supported within the receptacle of said static press, the said molding being submerged in the hot liquid. The said liquid is then very quickly subjected to a static pressure on the order of one ton per square inch. The static pressure must be applied quickly otherwise the liquid will seep in between the mandrel and the product under treatment. By the use of this viscous liquid and by a quick application of the static pressure, the use of the rubber or other packing usual in hydrostatic pressing of materials is eliminated. The molding is left in this liquid under pressure and at a temperature of around one hundred and forty (140) degrees centigrade or higher until the curing is effected.

Although I have mentioned specifically "cumar" and chlorinated napthalene as suitable materials to be employed for the formation of the liquid within which the molding is to be submerged and cured, it should be understood that any other relatively viscous liquid suitable, which is chemically neutral with respect to the material of the molding, may be employed.

The liquid employed, however, preferably should be one of such character that it will combine mechanically with the external surface of the molding and it should preferably be of such character that the surface resistivity of the molding will be increased by the incorporation of the outer portion of the molding with portions of the material within which the curing is effected. The extent to which the liquid within which the curing is effected may penetrate the molding may be controlled by the extent of the curing of the said molding within the mechanical mold before subjecting the same to the action of the liquid under static pressure, as above described.

The mechanical bond which is effected during the curing operation between the molding material and the "cumar" appears to be lasting. The resultant surface is speckled, that is, there are many small isolated specks of "cumar" which add greatly to the surface resistivity and tend to prevent wetting of the molded article when it is subjected to the weather. The surface in that respect has somewhat the characteristic of a wax.

A further advantage incident to the use of "cumar" as the material in which the curing is effected is that it is a completely polymerized substance which is a desirable characteristic of the material employed in the curing process of a molded phenolic condensation product.

This application is a division of my application Serial No. 728,985, filed July 29, 1924. In that application I have claimed the method which I have described above in a general way without referring to mechanism or apparatus for carrying out the method. It is understood that the method is not limited to any particular kind or form of mechanism but may be carried out by the use of any apparatus or machine which may be suitable and adapted to that end. However, one of the dominant aims of this invention is to provide an apparatus for carrying out this method which is thoroughly practical and efficient and capable of dependably effecting the results desired.

The present invention accordingly consists in the features of construction, combinations of elements and arrangements of parts which will be exemplified in the structure hereinafter described and the scope of the application of which will be indicated in the following claims.

In the drawings, in which is shown one of the various possible embodiments of this apparatus, Figure 1 is a view partly in vertical central section and partly in side elevation of a static press adapted for the curing of phenolic condensation products;

Figure 3 is a view in side elevation of the static press with the parts in different positions from that shown in Figure 1; and Figure 4 is a transverse sectional view taken on the line a—b of Figure 1.

Figures 1, 2:
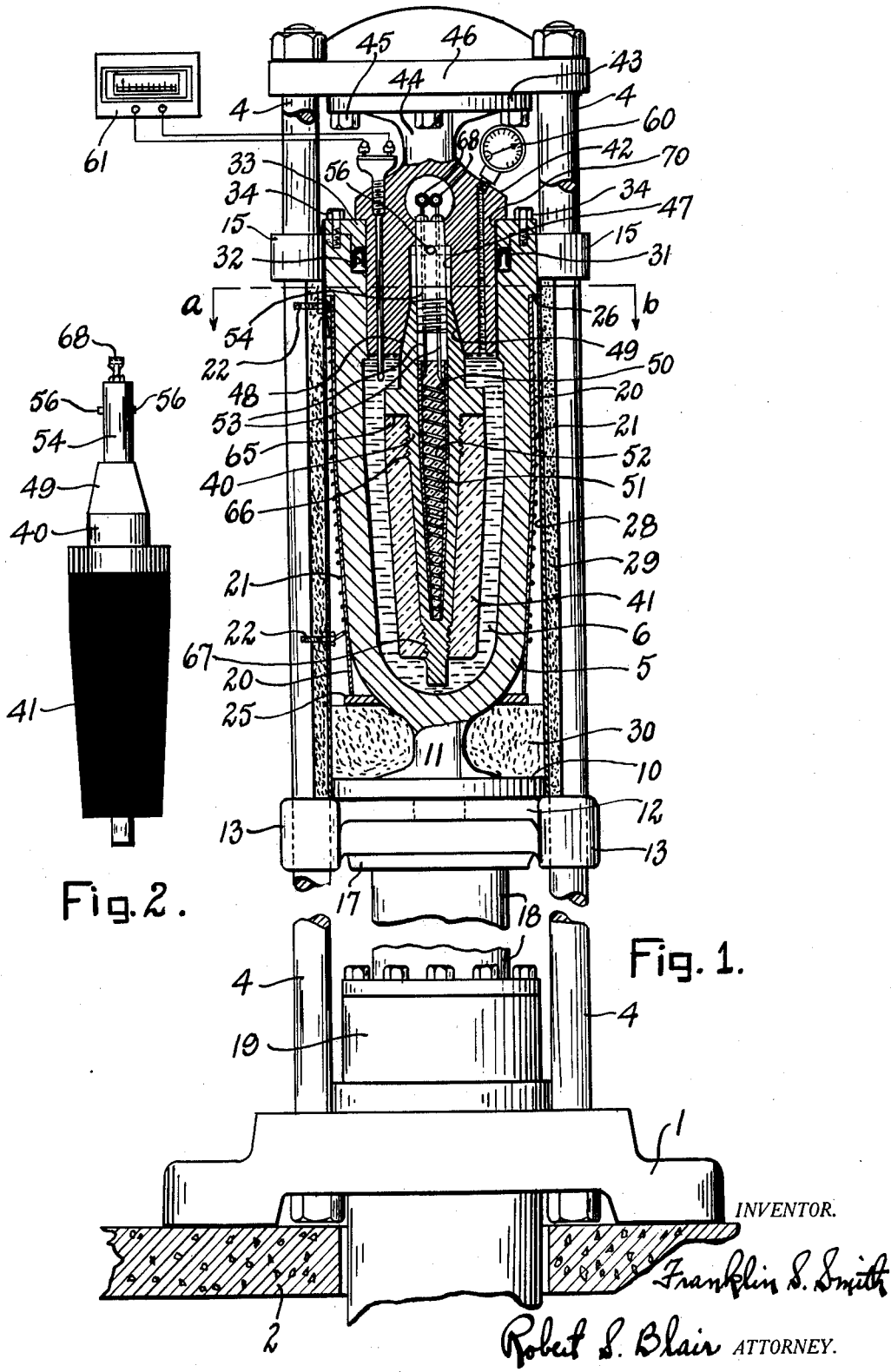
Figure 2 is a view in side elevation of a molding carried by a mandrel, such mandrel being the interior member of the mechanical mold.

Referring to the drawings, 1 designates a base which is supported upon a concrete or other support 2. A frame structure comprising four guide rods 4 is mounted upon the base 1. Movably mounted and supported upon the guide rods 4 is a structure comprising an exterior member 5 which is adapted to receive and hold the heated liquid 6 such as "cumar", "Halowax" or other suitable liquid. The exterior member 5 is provided with a base 10 connected thereto by means of a reduced neck-portion 11. The purpose of reducing the connection as indicated is to limit as far as it is practicable the conduction of heat from the static press. The base 10 is connected with and is supported upon a platform or support 12 which is provided with projecting sleeves 13 at its four corners through which the four guide rods 4 extend. The exterior member 5 of the press is also provided adjacent its upper end with laterally and outwardly extending sleeve-like projections 15 through which also the guide rods 4 extend.

The support or platform 12, previously referred to, rests upon the upper end or head 17 of the plunger or piston of a hydraulic press, the cylinder of which is indicated at 19. The reciprocating movements of the plunger or piston 18 cause like movements of the platform or support 12 together with the exterior member of the press 5 and certain parts carried thereby.

The exterior member 5 of the press is surrounded by a tubular casing 20 of insulating material which in turn is surrounded by a resistance coil 21, the opposite ends of which are connected to the binding posts 22. Upon the passage of current through this coil 21 it is heated and the heat is transmitted to the exterior member 5 of the press to effect heating thereof and of the liquid 6 therein. The lower end of the tubular insulating casing 20 rests upon the upper side of a flange 25 extending laterally from the lower end portion of the member 5, while the upper end thereof contacts with an annular shoulder 26 upon the outer end portion of the said member 5. The resistance coil 21, previously referred to, is inclosed within and spaced from a tubular casing 28 which extends between the platform or support 12 and the laterally projecting sleeve 15. The tubular casing 28 is surrounded by a relatively thick layer or structure 29 of heat insulating material such as asbestos fiber. A body of heat insulating material 30 is also provided within the lower portion of the casing 28 above the base 10 and below the flange 25 and surrounding the neck-portion 11 of the press member 5.

The inner edge portion of the upper end of the exterior member 5 of the press is provided with a cut-out portion 31 within the lower end of which is seated packing member 32 which consists of a strip of leather or other suitable material bent so that it is of inverted U shape in cross section. The said packing is held in place by a gland 33 secured by means of screw-threaded bolts 34 to the upper end of the member 5.

The press comprises an interior member 40 constituting a mandrel for the molding 41. As already pointed out herein the molding 41 is first formed upon the mandrel 40 in a molding apparatus of the usual and well known type within which the molding 41 is given a preliminary curing on the order of ten minutes duration at the chosen temperature after which the mandrel 40 with the molding thereon is removed and mounted upon the stationary member 42 having a base 43 connected thereto by a reduced neck-line portion 44 corresponding to the similar portion 11. The base 43 is secured by means of bolts 45 to a cross head 46 at the upper end of the guide rods 4. The stationary member 42 is provided with a central opening 47 the lower end of which is tapered as indicated at 48. The tapered upper end portion 49 of the mandrel 40 is adapted to be seated against the said tapered portion 48 to completely close the entrance to the opening 47. The interior of the mandrel 40 is bored out, as indicated at 50, so that it is hollow. The lower end of the opening in the mandrel is tapered as indicated to correspond with the exterior taper thereof. Mounted within the interior of the mandrel 40 and filling the same is a body of suitable insulating material 51 within which is imbedded a resistance coil 52. The opposite upper ends 53 of the said coil pass through an extension member 54 secured in the open outer end of the bore or opening 50—the said upper ends 53 are insulated from the said extension member and from each other. The opening 47 is provided with a bayonet-like slot which is adapted to be engaged by the projections 56 upon the extension 54 whereby the mandrel 40 with or without the molding 41 thereon is adapted to be supported in position upon the lower end of the stationary member 42. When the mandrel 40 is in position, as shown in Figures 1 and 3 of the drawings, the upper ends 53 of the coil 52 are in contact or in communication with the line wires by means of which electric current is supplied to the said resistance coil 52.

For the purpose of indicating the pressure which may be created within the press I have provided a pressure gage 60 and for indicating the temperature of the liquid 6 I have provided a pyrometer indicated as a whole at 61.

It will be observed that the mandrel 40 is provided with a shoulder 65 intermediate its ends by which the upper end of the molding is formed and against which it is seated, as shown in the drawings. Adjacent the shoulder 65 the said mandrel is provided with external screw-threads 66, the presence of which effects the formation of interior screw-threads adjacent the end of the interior of the molding. Adjacent its small end the mandrel 40 is also provided with external screw-threads 67 the presence of which effects the formation of the internal screw-threads in the opposite reduced end portion of the molding 41.

The particular molding disclosed is intended for use in connection with high voltage terminal structures and the internal screw-threaded portions are provided for the purpose of making certain necessary attachments.

In the operation of the apparatus and in the carrying out or practicing of the method the molding is first molded upon the mandrel 40, or a similar mandrel in a mechanical mold and given a preliminary curing treatment therein, as above described. In this preliminary curing operation the interior of the mold, that is to say, the mandrel, should be at a higher temperature than the exterior mold member in order that the curing may proceed from the interior toward the exterior of the molding.

The preliminary curing having been completed the mandrel with the molding thereon as shown in Figure 2 is transferred to an apparatus such as illustrated and is secured in place upon the stationary member 42 with the outer upper terminals 68 of the extensions 53 of the resistance wire 52 in contact or engagement with the line wires which communicate with the source of electric current supply not shown. The exterior member 5 of the press having been previously supplied with a suitable material, such as "cumar", is heated, the "cumar" liquefied and maintained at the desired temperature. This material constitutes the liquid 6. The member 5 is then elevated by means of the plunger 18 so that the molding is submerged within the said liquid 6. By reason of the upward movement of the external member 5 of the press the stationary piston-like member 42 is caused to enter the upper end thereof, as shown in Figure 1 of the drawings, so that the liquid 6 within the member 5 may be and is subjected to great pressure, the pressure being on the order of two thousand pounds per square inch. It may be noted here that the upward movement of the member 5 under the influence of the ram or piston 18 is adapted to be limited by the shoulder 70 near the upper end portion of the member 42.

The molding having been submerged within the liquid 6 is retained therein under the pressure indicated during the period that the curing is being effected which may be several hours, the length of time depending upon the thickness of the molding. The curing should be effected at a temperature on the order of 140 degrees. As already indicated, during the preliminary curing in the mechanical mold in and by which the molding is originally formed the temperature of the interior should be greater than that of the exterior in order that the curing or change of form may take place from the interior towards the exterior of the molding. When the curing is effected in this manner the gases which may be present within the body of the material of which the molding is composed are caused to escape outwardly through the molding while it is in a permeable condition. By this method the formation of porous or defective portions is prevented. Likewise during the curing operation within the apparatus disclosed and described herein the mandrel 40 should be maintained at a higher temperature than that of the external member 5 of the press.

After the curing of the molding has been completed the ram or piston 18 is lowered so as to lower the external member of the mold structure. The mandrel 40 is then disengaged and removed from the stationary piston-like member 42 and while the molding 41 is still hot it is turned so as to remove or back it off of the mandrel 40. The molding is then cooled very slowly to room temperature.

It will be observed that in the carrying out of the method embodying my invention the interior of the molding is shaped by the mandrel from which it is not removed until the curing thereof has been completed so that the inner surface which in the molding as illustrated is the important surface is maintained in its original accurate shape and contour.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In apparatus for treating moldings of phenolic condensation product the combination of an external static press member adapted to maintain a liquid at a temperature on the order of 140° C., a stationary member adapted to enter the open end of the said external member, a mandrel adapted to be supported upon the said stationary member, means for movably supporting the external static press member and means for causing movement of the said external member to cause it to engage and disengage the said stationary member.

2. In apparatus for treating moldings of phenolic condensation product, the combination of an external static press member having an open end, means for movably supporting the said member, a stationary piston-like member mounted upon the said means, a mandrel detachably mounted upon the said stationary piston member, and means for causing movement of the said external static press member to cause the said piston member to enter the open end of the said external static press member.

3. In apparatus for treating moldings of phenolic condensation product, the combination of an external static press member having an open end, a piston member adapted to enter the said open end, a mandrel detachably mounted upon the said piston and means for causing relative movement between the said piston and the said external static press member whereby the said piston and mandrel are caused to enter the said external static press member.

4. In apparatus for treating moldings of phenolic condensation product, the combination of an external static press member having an open end and which is adapted to receive a body of liquid which is chemically neutral to phenolic condensation product, a piston member, a mandrel detachably mounted upon said piston member, means for supporting the said external static press and piston members, which members are relatively movable, means for causing movement of one of said members to cause the said piston and mandrel to enter the said external static press member, means for heating the exterior static press member, and means for heating the interior of the said apparatus.

5. In apparatus of the class described, in combination, a receptacle adapted to receive a liquid which is chemically neutral to phenolic condensation product, means adapted to form a liquid-tight closure for said receptacle, said last means and said receptacle being movable relative to one another and said closure means having means for supporting a molding within said liquid and free from engagement with the walls of said receptacle, and means for effecting relative movement between said receptacle and said closure means to subject said liquid to pressure to compress said molding, said movement-effecting means acting in a direction to tend to lessen the space occupied by said liquid.

6. In apparatus of the class described, in combination, a receptacle adapted to receive a liquid which is chemically neutral to phenolic condensation product, removable means adapted to form a liquid-tight closure for said receptacle, a mandrel carried by said last means and supported thereby within said receptacle, said mandrel having a molding formed thereon and carried thereby free from engagement with the walls of said receptacle and surrounded by said liquid, means for subjecting said liquid to pressure to compress said molding upon said mandrel, and means interfitting said mandrel and said closure means so that the pressure of said liquid assists in holding said mandrel in place.

7. In apparatus of the class described, in combination, a receptacle adapted to receive a liquid, removable means adapted to form a liquid-tight closure for said receptacle, said last means having means for supporting a molding within said liquid and free from engagement with the walls of said receptacle, and means for forcing said receptacle and said closure means together to subject said liquid to high pressure and compress said molding.

8. In apparatus of the class described, in combination, a receptacle adapted to receive a liquid, a member supported within said receptacle in spaced relation to the walls thereof and adapted to support thereabout a molding to be treated, means including two relatively movable portions of said receptacle for placing said liquid under pressure, means for heating said member interiorly of said molding, and means for heating said liquid exteriorly of said molding.

9. In apparatus of the class described, in combination, a receptacle adapted to receive a liquid, a member supported within said receptacle in spaced relation to the walls thereof and adapted to support thereabout a molding to be treated, means for heating said member interiorly of said molding, means for heating said liquid exteriorly of said molding, and means operative in a direction to diminish the volume of the liquid-receiving space in said receptacle for subjecting said liquid to pressure to compress said molding.

10. In apparatus of the class described, in combination, a receptacle adapted to receive a liquid, a mandrel adapted to support thereon a molding to be treated, means for supporting said mandrel within said receptacle with said molding surrounded by said liquid, means for heating said mandrel interiorly, and means operative in a direction to diminish the volume of the liquid-receiving space in said receptacle for subjecting said liquid to high pressure.

11. In apparatus of the class described, in combination, a receptacle adapted to receive a liquid, a substance in said receptacle that is solid at normal temperatures but liquid at higher temperatures, a mandrel adapted to support thereon a molding to be treated, means for supporting said mandrel within said receptacle with said molding surrounded by said liquid, means for heating said substance to maintain it liquid and to maintain said liquid to a temperature on the order of 140° C., and means for subjecting said liquid to pressure on the order of two thousand pounds per square inch.

12. In apparatus of the class described, in combination, a receptacle adapted to receive a liquid and having an opening therein, a removable member adapted to close said opening, a member removably secured to said closure member, said last member being adapted to support a molding to be treated within said receptacle and surrounded by said fluid, and means for relatively moving said receptacle and said closure member to compress said liquid.

13. In apparatus of the class described, in combination, a receptacle adapted to hold a liquid and having an opening therein, means adapted to support a molding to be treated within said receptacle and surrounded by said liquid, a piston-like member adapted to close said opening, and means for relatively moving said last member and said receptacle to place said liquid under pressure.

14. In apparatus of the class described, in combination, a cylinder adapted to hold a liquid, a piston adapted to coact with said cylinder, means upon said piston adapted to support a molding to be treated within said cylinder, and means for relatively advancing said piston and said cylinder to place the liquid about said molding under pressure.

15. In apparatus of the class described, in combination, a chamber adapted to receive a liquid and having an opening therein, a piston-like member adapted to close said opening, a mandrel carried by said piston adapted to support thereabout a molding within said chamber and surrounded by said liquid, means for heating said mandrel, means for heating the walls of said chamber, and means for moving said chamber toward said piston-like member to exert pressure upon said liquid.

16. In apparatus of the class described, in combination, a mandrel adapted to support thereon a molding to be treated, means for heating said molding exteriorly, and means for heating said mandrel to a temperature such that the temperature of the interior of the molding is higher than the temperature of the exterior of the molding.

17. In apparatus of the class described, in combination, means for supporting a molding to be treated, and means for heating said molding, said heating means being adapted to heat one portion of said molding to a higher temperature than another portion thereof.

18. In apparatus of the class described, in combination, a chamber having therein a member having an electrical heating unit related thereto and adapted to support and heat a molding to be treated, a fluid within said chamber and about said molding, and movable means acting directly upon the fluid for subjecting said fluid to relatively high pressure, said movable means being associated with said chamber and movable relative thereto in a direction to diminish the space occupied by said fluid, thereby to subject the latter to said pressure.

19. In apparatus of the class described, in combination, a member having an electrical heating unit related thereto and adapted to support and heat a molding to be treated, a chamber within which said member and said molding are received and containing a liquid, an electric heating unit for heating said liquid, and means for effecting relative movement between said member and said chamber in a direction to tend to lessen the space occupied by said liquid and for thereby subjecting said liquid to pressure thereby to compress said molding.

20. In apparatus of the class described, in combination, a member having an electrical heating unit related thereto and adapted to support and heat a molding to be treated, a chamber within which said means and said molding are received and containing a liquid, said chamber including two relatively movable parts adapted upon movement in one direction to subject said liquid to pressure thereby to compress said molding, and an electric heating unit for heating said liquid.

21. In apparatus for treating moldings of phenolic condensation product, the combination of a receptacle adapted to receive a liquid and having exposed to the latter a molding to be treated, of means for heating said liquid thereby to heat the exterior portions of said molding, and means for heating the interior of said molding to a higher temperature than the exterior portions thereof.

22. In apparatus for treating moldings of phenolic condensation product, the combination of a receptacle adapted to receive a liquid and having exposed to the latter a molding to be treated, of means for heating said liquid thereby to heat the exterior portions of said molding, means for heating the interior of said molding to a higher temperature than the exterior portions thereof, and means for subjecting said liquid to relatively high pressure thereby to compress said molding.

23. In apparatus for treating moldings of phenolic condensation product, in combination, a cylinder member adapted to receive a molding and a substance that is solid at normal temperatures and liquid at higher temperatures, a piston member adapted to coact with said cylinder member, means for effecting relative movement between said members to place said liquid under pressure and hence to subject said molding to pressure, and means for maintaining said substance in liquid form while under pressure.

24. In apparatus for treating moldings of phenolic condensation product, in combination, a cylinder member adapted to receive a substance that is solid at normal temperatures and liquid at higher temperatures, a piston member adapted to coact with said cylinder member, means upon one of said members for supporting a molding to be treated within said cylinder member, means for maintaining said substance at a temperature such that it is liquid, and means for effecting relative movement between said members in a direction to subject said liquid and hence said molding to pressure.

25. In apparatus for treating moldings of phenolic condensation product, in combination, a cylinder member adapted to receive a substance that is solid at normal temperatures and liquid at higher temperatures, a piston member adapted to coact with said cylinder member, means upon one of said members for supporting a molding to be treated within said cylinder member, means effective through said supporting means for heating said molding, means for preventing the temperature of said substance from diminishing and for thereby preventing solidification of the liquid, and means for effecting relative movement between said members in a direction to subject said liquid and hence said molding to pressure.

26. In apparatus for treating moldings of phenolic condensation product, in combination, a cylinder member adapted to receive a substance that is solid at normal temperatures and liquid at higher temperatures, a piston member adapted to coact with said cylinder member, means upon one of said members for supporting a molding to be treated within said cylinder member, means effective through said supporting means for heating said molding, means effective through said cylinder member for heating said substance so that the latter is liquid, and means for effecting relative movement between said members in a direction to subject said liquid and hence said molding to pressure.

FRANKLIN S. SMITH.